United States Patent

[11] 3,608,735

[72] Inventor Leo R. Smith
 1203 South 28th St., Fort Pierce, Fla. 33450
[21] Appl. No. 874,464
[22] Filed Nov. 6, 1969
[45] Patented Sept. 28, 1971

[54] SPIGOT ADAPTER CONNECTION FOR PRESSURE HOSE
 10 Claims, 4 Drawing Figs.
[52] U.S. Cl. .................................................... 210/449
[51] Int. Cl. .................................................... B01d 35/04
[50] Field of Search ........................................ 210/449, 460, 463

[56] References Cited
 UNITED STATES PATENTS
 868,825 10/1907 Young ............................ 210/449 X
 2,879,207 3/1959 Poitras ........................... 210/446 X FOREIGN PATENTS
 12,355 5/1911 Great Britain ................. 210/449 X Primary Examiner—Reuben Friedman
Assistant Examiner—R. W. Burks
Attorneys—Clarence A. O'Brien and Harvey B. Jacobson ABSTRACT: A self-contained attachment which permits a hydraulic oral hygiene dental syringe to be operatively joined to a spigot. It is characterized by an adapter, coupling means connected with the adapter, and a funnel-type connector, which also constitutes an adapter, and is carried by the coupling means and to which a hose is connected. In practice the usual filter-type spigot strainer unit is removed and replaced by the herein disclosed attachment which embodies, as one of its features, a built-in spring-loaded filtering screen or strainer. The overall attachment constitutes a spigot-to-hose filtering device.

PATENTED SEP 28 1971

3,608,735

To Hydraulic Dental Syringe

Leo R. Smith
INVENTOR.

BY Clarence A. O'Brien
and Harvey B. Jacobson
Attorneys

SPIGOT ADAPTER CONNECTION FOR PRESSURE HOSE

This invention relates to certain new and useful improvements in a self-contained attachment which provides a replacement unit for a commonly used filtering-type antisplash water spigot strainer and which is characterized by an adapter, a funnel-type hose connector, coupling means communicatively and clampingly connecting the connector with the adapter, and a complemental spring-biased filtering screen which is renewably confined in the coupling means.

It may well be pointed out here that the attachment, stated generally, constitutes a spigot-to-hose unit which is such in construction and adaptability that it can be used in lieu of the water filtering and strainer unit which is conventional on virtually all household spigots and faucets. The regularly used unit is unscrewed and detached and the herein disclosed attachment is substituted therefor. The attachment replaces the detached strainer in that it has a self-contained spring-loaded filtering screen embodied therein. Then too it is an innovation in that it serves to permit a hose of a suitable type to be applied and removed at will, for example, the type of hose which constitutes a significant part of the hydraulic dental syringe disclosed in my prior U.S. Pat. No. 3,424,156 of Jan. 28, 1969.

It should be noted in connection with the aforementioned U.S. Pat. NO. 3,424,156 that the attachable and detachable end of the flexible hose is equipped with a cup-shaped squeeze-on hose connection. Experience has shown that this type of connection lends itself to acceptable use on almost types of spigots and faucets. On the other hand and as has been repeatedly observed this cup-type connector will leak or perhaps be dislodged and displaced when subjected to sudden overpressure of the discharging water stream. This condition has prompted the development and perfection of the instant invention which, as mentioned is unique in that it serves not only as a replacement for the usual detachable spigot strainer but provides the filtering step and includes clamping means for the beaded end of a funnel-shaped connector which, in turn, facilitates proper communicative connection of the intake end of the dental hose therewith.

Briefly, the spigot attachment disclosed has to do with coupling means which, in turn, embodies an outer sleeve having an upper internally screw-threaded end which functions to accommodate an adapter and which also has a lower inwardly curved and reduced terminal end which defines an internal concave annular surface constituting a ledgelike seat or retaining shoulder. The inner wall of the axial bore of the outer sleeve has an endless groove which is parallel and proximal to the terminal end of the shouldered portion. There is an inner sleeve complemental to and somewhat shorter than the outer sleeve and this is fittingly and slidingly mounted in the bore of the outer sleeve. The outer wall of the inner sleeve has an endless groove containing an O-ring which has wiping and sealing contact with the coacting surfaces of the wall of the bore of the outer sleeve. The inner sleeve has a gradually reduced inwardly curved lower end portion which is proportionally conformable with and is adjustable or movable toward and from the ledgelike seating shoulder. The hose connector is pliant and attachable and detachable and has a depending nipple for attachment to the hose and an upwardly outwardly flaring funnel portion. This funnel portion is seated on the shoulder and has a terminal annular bead which is seated in the accommodating groove and, in fact, is clampingly held in the groove by the inwardly curved lower end portion of the inner sleeve. An adapter is provided of one type or another and the adapter has a screw-threaded neck at its lower end which is screwed into the upper end of the outer sleeve providing the desired coordination of parts. It also has an upper end with means which is operatively and communicatively connected to the water discharge end of the spigot. The filtering screen is housed in the bore of the outer sleeve and is seated on the coacting upper end of the inner sleeve and is yieldingly held by a confined coil spring of predetermined tension, that is, a spring which is interposed between the filtering screen and the coacting and enclosed lower end of the separable and connectable adapter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
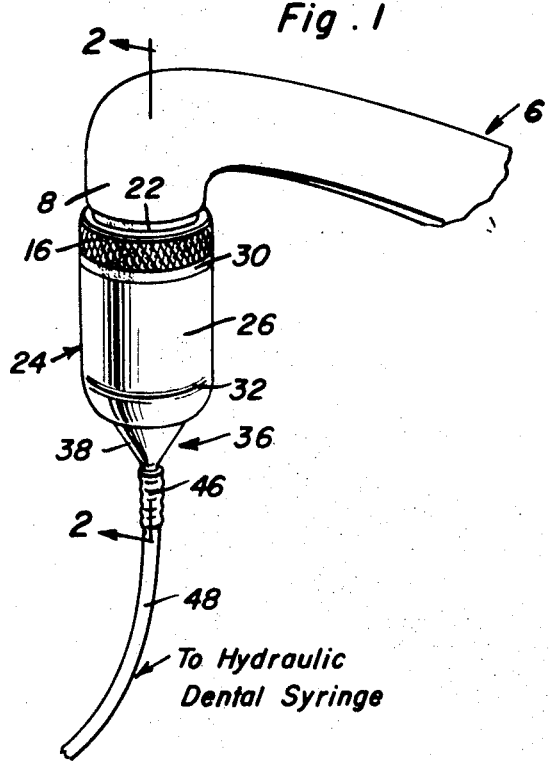
FIG. 1 is a view in perspective showing the discharge end of a conventional-type kitchen faucet or spigot and showing, what is more significant, the self-contained attachment, how it is connected with the discharge end of the spigot and how it functions to accommodatingly support an attachable and detachable end of a hydraulic dental syringe hose.
Figure 2:
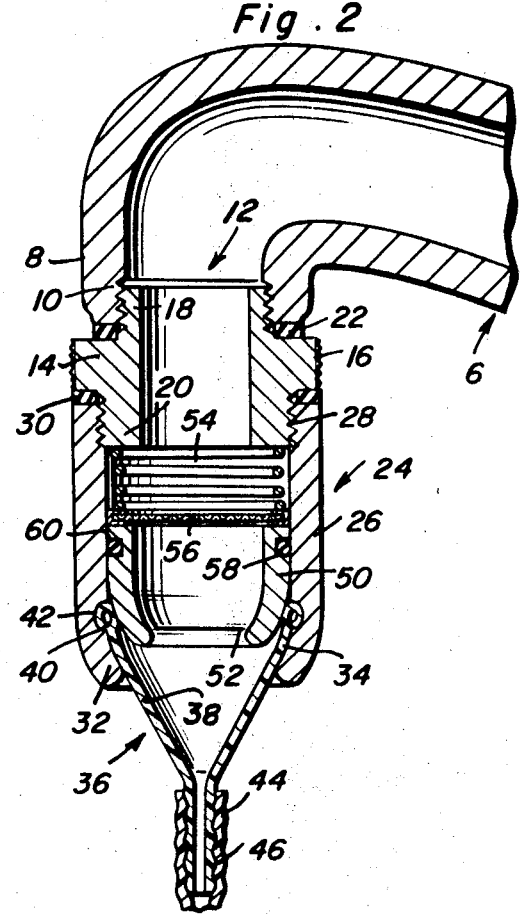
FIG. 2 is a view on an enlarged scale taken approximately on the plane of the vertical section line 2—2 of FIG. 1, looking in the direction of the indicating arrows.

With reference to FIGS. 1 and 2 it will be noted that the aforementioned faucet or spigot is denoted by the numeral 6 and has a downturned discharge end portion 8 which has internal screw threads 10 to accommodate an attaching neck on a conventional-type attachable and detachable so-called antisplash strainer or filter and which as is known is substantially standard on all present-day spigots. This strainer is not here shown and has of course been removed in order to pave the way for replacement by the self-contained attachment.

Figure 3:
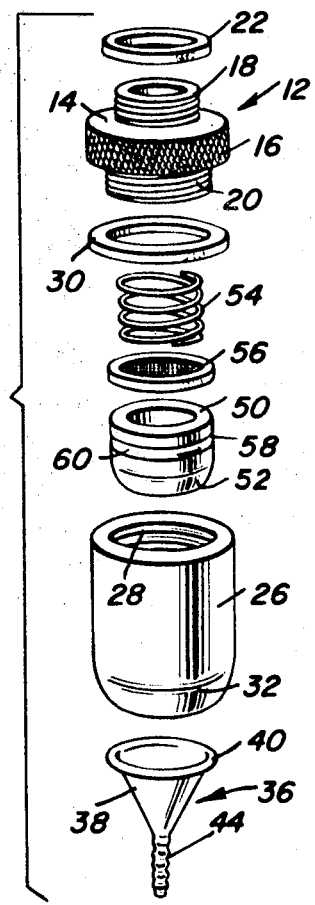
FIG. 3 is an exploded perspective view showing all of the essential component parts of the overall attachment in coordinating or oriented relationship.

With reference now to the attachment and the connectable adapter shown in FIGS. 1 to 3, inclusive, it will be evident that the adapter is designated by the numeral 12 and comprises an axially bored member which is characterized by a centrally located outstanding flange 14 which is externally knurled in a manner to provide a convenient finger grip as at 16. The upper end of the adapter embodies an externally screw-threaded attaching neck 18 which is such in diameter and construction that it screws into the threads 10 to provide the connection shown in FIG. 2. The lower end portion of the adapter is provided with a similarly constructed externally threaded neck 20. When the neck 18 is screwed into place a fluidtight connection is provided by the rubber or equivalent washer 22. The aforementioned coupling means, which is attached to and suspended by the neck 20 is denoted, generally stated, by the numeral 24 and comprises a cylindrical outer rigid sleeve 26 whose upper end portion is provided with internal screw threads 28. The neck 20 is screwed into the threads and a packing ring or washer is interposed between the coacting surfaces as denoted at 30. The lower end portion of the outer sleeve is curved inwardly and reduced in cross section as at 32 and the interior surface is fashioned into and provides a seating shoulder 34. This shoulder lends itself to firm and retentive seating of the upper mouth portion of the funnel-shaped hose connector 36, more particularly the funnel portion 38. The extreme upper end is fashioned into a firm but compressibly resilient bead 40 which is fitted into a seating and sealing groove 42 provided in the bore of the sleeve just above the level of the inturned portion 32. The lower axial portion of the connector is provided with an appropriately corrugated and reduced neck 44 to which the upper flexible end 46 of the hose 48 is separably connected. In actual practice this hose extends to and is operatively connected with a hydraulic dental syringe of the type shown in my previous U.S. Pat. No. 3,424,156.

The funnel-shaped end 38 of the connector 36 is insertable and removable and when inserted to assume the position illustrated in FIG. 2 the beaded portion is held with requisite certainty by the inner sleeve 50. This sleeve is substantially cylindrical in shape and of a diameter that the outer peripheral surface has sliding wiping contact with the interior of the wall of the outer sleeve 26. The inner sleeve has a reduced turned in end 52 which telescopes into the funnel and clampingly binds and holds the bead 40 in its seating groove 42. It will be noted that the inner clamping sleeve 50 is spring-biased by an appropriately tensioned coil spring 54 confined in the bore of the outer sleeve and having its upper end abutting the lower end of the neck 20 and its lower end resting yieldingly atop an insertable and removable water-filtering screen 56. More specifically this screen rests atop the upper end of the inner sleeve as is evident from the illustration thereof in FIG. 2. For desired results the outer upper peripheral portion of the inner sleeve 50 is provided with an endless groove 58 which receives and retains an O-ring 60 in its fluid sealing position. Thus the attachment is characterized, generally stated, by a dual neck adapter 12, an axially aligned adapter-type hose connector 36 and intervening coupling means 24 characterized by the outer sleeve 26, the spring-loaded inner sleeve 50 and the spring-held strainer or screen interposed between adjacent flat parallel ends of the neck 20 and sleeve 50 respectively.

The connector 36 is proportional to the respective inner and outer sleeves and is flexible and resilient so that it can be manually squeezed and inserted to assume the position shown in FIG. 2. The connector can be aptly and easily forced into place in a manner to provide the desired spigot-to-hose assembly illustrated and readied for use as shown in FIG. 2.

Figure 4:
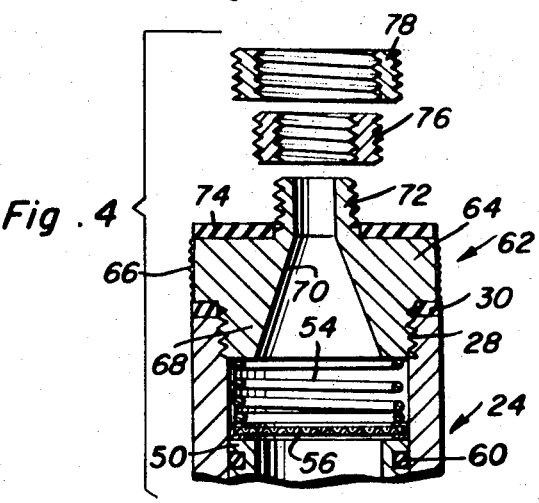
FIG. 4 is a view similar to FIG. 2 with the spigot removed and showing a modification, that is a modified form of an adapter which has selectively usable and adaptable screw-threaded collars for variable attaching needs and purposes.

Inasmuch as the dual neck one-piece adapter 12 may not be acceptable for use under all conditions it may be advisable and desirable to provide some other suitably constructed adapter, for example the adapter which is shown in FIG. 4 and is denoted by the numeral 62. Here the body portion of the adapter is again provided with a gripping flange 64 with a knurled exterior surface 66. The lower end portion of the adapter body is fashioned into an appropriate coupling neck 68. The shape of the bore 70 may vary and may be and preferably is of that shape shown in FIG. 4. The upper end here is provided with a reduced externally screw-threaded neck 72 surrounded by a packing ring 74. This neck serves to accommodate an internally and externally screw-threaded first smaller collar 76 which can be used alone or in conjunction with a complemental second collar 78 which is also internally and externally screw threaded. The manner in which these collars are put together and used will be evident from the illustration shown in FIG. 4. Insofar as the coupling means 24 is concerned it is the same as already described.

It may be added that the connector 36 can be construed properly as a companion part of the overall attachment or as a separate expedient which can be installed after the attachment is applied in the manner shown in FIG. 2. Alternatively it would be within the purview of the invention to provide an integral connection between the hose end 46 and the lower apical end of the connector 36. That is to say it is not necessary that the parts 36 and 48 be made as separate connectable components.

The adapter 12, alternatively, the adapter means 62 (FIG. 4) can, within the purview of the concept, be so designed and constructed that it can be operatively connected not only with the spigot 6, but with any structurally or functionally equivalent spigot, faucet, cock or valve (not shown). The connector 36, which also constitutes an adapter between the hose 48 and coupling means 24, may and can likewise be varied in construction and provided with any suitable fitting 44 for any type of hose which has to be operatively connected thereto. It follows that neither adapter above-mentioned has a set or standardized size and in fact can be made from any suitable material for mating use with the spigot or valve to which it is to be connected.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For optionally applicable and removable use on the customary internally screw-threaded water discharge end of a household-type sink or equivalent spigot: a self-contained spigot attachment characterized by an adapter having a body with an axial bore providing a water delivery passage, said body having an exteriorly knurled finger grip, upper exteriorly threaded means adapted to be operatively screwed into said discharge end, and a lower screw-threaded neck, hose coupling means embodying an outer sleeve having an upper internally screw-threaded end communicatively screwed on said neck and a lower end portion interiorly provided with readily attachable and detachable hose connector means, and inner sleeve conformingly and slidingly mounted within the bore of said outer sleeve, said inner sleeve having fluidtight sealing and packing means cooperable with the encompassing wall of said bore, and a tensioned coil spring confined in the bore of said outer sleeve and having one end abutting an end of said lower screw-threaded neck and a lower end abutting and cooperable with an ad adjacent upper end of said inner sleeve.

2. The attachment defined in and according to claim 1, and, in combination an insertable replaceable water filtering screen confined in said axial bore and interposed between a coacting lower end of the said coil spring and a coacting upper end of said inner sleeve.

3. The attachment defined in and according to claim 1, and wherein the upper exteriorly threaded means comprises a reduced exteriorly threaded screw-in adapter mounting neck, said sealing and packing means comprising an O-ring operatively seated in an endless groove provided therefor in an outer peripheral surface of said inner sleeve.

4. The attachment defined in and according to claim 1, and wherein the upper exteriorly threaded means comprises an axially reduced relatively small upstanding screw-threaded neck, a first internally and externally screw-threaded collar adapted to be screwed on said neck, and a second internally and externally screw-threaded collar larger than said first collar and adapted to be cooperatively and fittingly screwed on said first collar.

5. The attachment defined in and according to claim 3, and, in combination, an insertable replaceable water filtering screen confined in said axial bore and interposed between a coacting lower end of said coil spring and a coacting upper end of said inner sleeve.

6. The attachment defined in and according to claim 1, and wherein the lower end of said outer sleeve is curved inwardly and is thus reduced in external diameter and has an interior concave annular surface providing a seating shoulder for an attachable and detachable funnel-shaped hose connector, and also has an internal endless groove for reception and retention of a bead on a terminal end of the funnel portion of said hose connector.

7. The attachment defined in and according to claim 6, and wherein said inner sleeve having an inwardly curved and reduced lower end providing a clamping shoulder and slidably bridging and oriented with said endless groove.

8. A self-contained water spigot attachment comprising coupling means embodying an outer sleeve having an upper end adapted to accommodate an adapter, a lower inwardly curved and reduced end defining an internal concave annular surface defining a ledgelike seating and retaining shoulder, the inner wall of the axial bore of said outer sleeve having an endless groove, an inner sleeve complemental to and shorter than said outer sleeve and fittingly and slidingly mounted in the bore of said outer sleeve, said inner sleeve having a gradually reduced inwardly curved lower end portion conformable with and movable toward and from said seating shoulder, a pliant attachable and detachable hose connector having an upwardly outwardly flaring funnel portion seated on the shoulder and a terminal annular bead seated in said groove and clampingly held therein by said inwardly curved lower end portion.

9. A spigot attachment defined in and according to claim 8, and, in combination, a filter screen confined in the bore of said outer sleeve and seated on a coacting upper end of the inner sleeve, and a coil spring of predetermined tension in said bore and interposed between said filter screen and a coacting enclosed lower end of said adapter.

10. The spigot attachment defined in and according to claim 9, and wherein said funnel is provided at a lower end with a fitting for separably connecting an end of a hose thereto.